US012756647B2

(12) United States Patent
Kurakami

(10) Patent No.: US 12,756,647 B2
(45) **Date of Patent: *Oct. 6, 2026**

(54) TESTING DEVICE, TESTING METHOD, AND TESTING PROGRAM

(71) Applicant: NTT, Inc., Tokyo (JP)

(72) Inventor: Hiroshi Kurakami, Musashino (JP)

(73) Assignee: NTT, Inc., Tokyo (JP)

( * ) Notice: Subject to any disclaimer, the term of this patent is extended or adjusted under 35 U.S.C. 154(b) by 318 days.

This patent is subject to a terminal disclaimer.

(21) Appl. No.: 18/029,111

(22) PCT Filed: Oct. 2, 2020

(86) PCT No.: PCT/JP2020/037646

§ 371 (c)(1),
(2) Date: Mar. 29, 2023

(87) PCT Pub. No.: WO2022/070425

PCT Pub. Date: Apr. 7, 2022

(65) Prior Publication Data

US 2023/0318956 A1 Oct. 5, 2023

(51) Int. Cl.
*H04L 43/0876* (2022.01)
*H04L 9/40* (2022.01)

(52) U.S. Cl.
CPC ...... *H04L 43/0876* (2013.01); *H04L 63/1433* (2013.01)

(58) Field of Classification Search
CPC .................................................. H04L 63/1433
See application file for complete search history.

(56) References Cited

U.S. PATENT DOCUMENTS

| | | | | |
|---|---|---|---|---|
| 6,892,236 | B1 * | 5/2005 | Conrad | G06F 11/3409 709/224 |
| 9,549,333 | B2 * | 1/2017 | Akman | H04W 24/10 |
| 9,871,850 | B1 * | 1/2018 | Brandwine | H04L 67/10 |
| 10,516,743 | B1 * | 12/2019 | Qin | H04L 67/01 |
| 10,733,073 | B1 * | 8/2020 | Watts | G06F 11/3414 |
| 12,124,590 | B2 * | 10/2024 | Kurakami | G06F 21/57 |

(Continued)

FOREIGN PATENT DOCUMENTS

| | | | |
|---|---|---|---|
| CN | 111200537 | A | 5/2020 |
| JP | 2020-129736 | A | 8/2020 |

OTHER PUBLICATIONS

Ixia, "Denial of Service (DOS) Testing", IxChariot, Available Online At: https://support.ixiacom.com/sites/default/files/resources/test-plan/dos_0.pdf, 2005, pp. 1-9.

*Primary Examiner* — Douglas B Blair
(74) *Attorney, Agent, or Firm* — XSENSUS LLP

(57) ABSTRACT

A test device includes processing circuitry configured to access a test target site managed by a test target device to acquire information on the test target site, and specify test settings for increasing a processing load of the test target device based on the information, manage session information of a test packet for increasing a processing load on the test target device, construct a test session with the test target device according to a scenario based on the test settings specified, and generate the test packet, and transmit the test packet for increasing the processing load to the test target device.

8 Claims, 5 Drawing Sheets

(56) References Cited

U.S. PATENT DOCUMENTS

| | | | | |
|---|---|---|---|---|
| 2002/0138226 | A1* | 9/2002 | Doane | G06F 11/2294 714/E11.173 |
| 2009/0320137 | A1* | 12/2009 | White | H04L 63/1433 707/999.102 |
| 2014/0046645 | A1* | 2/2014 | White | H04L 63/1433 703/13 |
| 2016/0021117 | A1* | 1/2016 | Harmon | H04L 63/20 726/1 |
| 2017/0324803 | A1* | 11/2017 | Shaath | G06F 11/36 |
| 2022/0116413 | A1 | 4/2022 | Kurakami | |
| 2023/0318929 | A1* | 10/2023 | Soosahabi | G06F 11/3688 709/224 |
| 2024/0169067 | A1* | 5/2024 | Kurakami | G06F 21/57 |

* cited by examiner

TESTING DEVICE, TESTING METHOD, AND TESTING PROGRAM

CROSS-REFERENCE TO RELATED APPLICATION

The present application is based on PCT filing PCT/JP2020/037646, filed Oct. 2, 2020, the entire contents of which are incorporated herein by reference.

TECHNICAL FIELD

The present invention relates to a test device, a test method, and a test program.

BACKGROUND ART

Conventionally, a method of transmitting a packet for applying a load to a device and performing a packet load test has been proposed (see, for example, Non Patent Literature 1). In addition, a method of performing a packet load test on a target device protected by a security system has been proposed (see, for example, Patent Literature 1).

CITATION LIST

Patent Literature

Patent Literature 1: Japanese Laid-open Patent Publication No. 2020-129736

Non Patent Literature

Non Patent Literature 1: IXIA, "Denial of Service (DOS) Testing", [online], [Retrieved on Sep. 15, 2020], Internet ≤support.ixiacom.com/sites/default/files/resources/test-plan/dos_0.pdf>

SUMMARY OF INVENTION

Technical Problem

However, in the conventional method, since the configuration of the test target site cannot be ascertained before the test, the transmission destination of the test packet is limited to a known page. As a result, there is a problem that even if there is a weak point in the test target site, it cannot be effectively extracted.

Solution to Problem

In order to solve the above-described problems and achieve the object, according to the present invention, there is provided a test device including: processing circuitry configured to: access a test target site managed by a test target device to acquire information on the test target site, and specify test settings for increasing a processing load of the test target device based on the information; manage session information of a test packet for increasing a processing load on the test target device; construct a test session with the test target device according to a scenario based on the test settings specified , and generate the test packet; and transmit the test packet for increasing the processing load to the test target device.

Advantageous Effects of Invention

According to the present invention, it is possible to automatically perform a load test for effectively extracting a weak point of a test target site by using a packet of an effective attack type in which an URL or a query with which there is a high likelihood that an attack for increasing a processing load of the test target site will succeed is set.

DESCRIPTION OF EMBODIMENTS

Hereinafter, embodiments of a test device, a test method, and a test program according to the present application will be described in detail with reference to the drawings. Note that the present invention is not limited by this embodiment.

Figure 1:
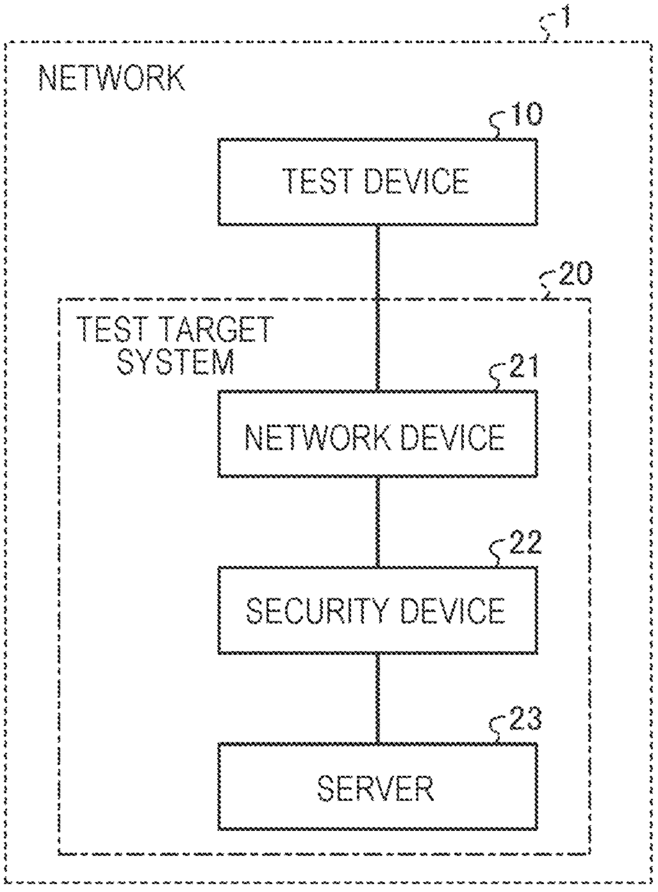
FIG. 1 is a diagram illustrating an example of a configuration of a network including a test device according to a first embodiment.

[Configuration of First Embodiment] First, a configuration of a network including a test device according to a first embodiment will be described with reference to FIG. 1. FIG. 1 is a diagram illustrating an example of a configuration of a network including a test device according to a first embodiment.

As illustrated in FIG. 1, a network 1 includes a test device 10 and a test target system 20. In addition, the test target system 20 includes a network device 21, a security device 22, and a server 23. Each system and each device of the network 1 are connected by an arbitrary type of communication network such as a wired or wireless local area network (LAN) or virtual private network (VPN), for example.

Figure 2:
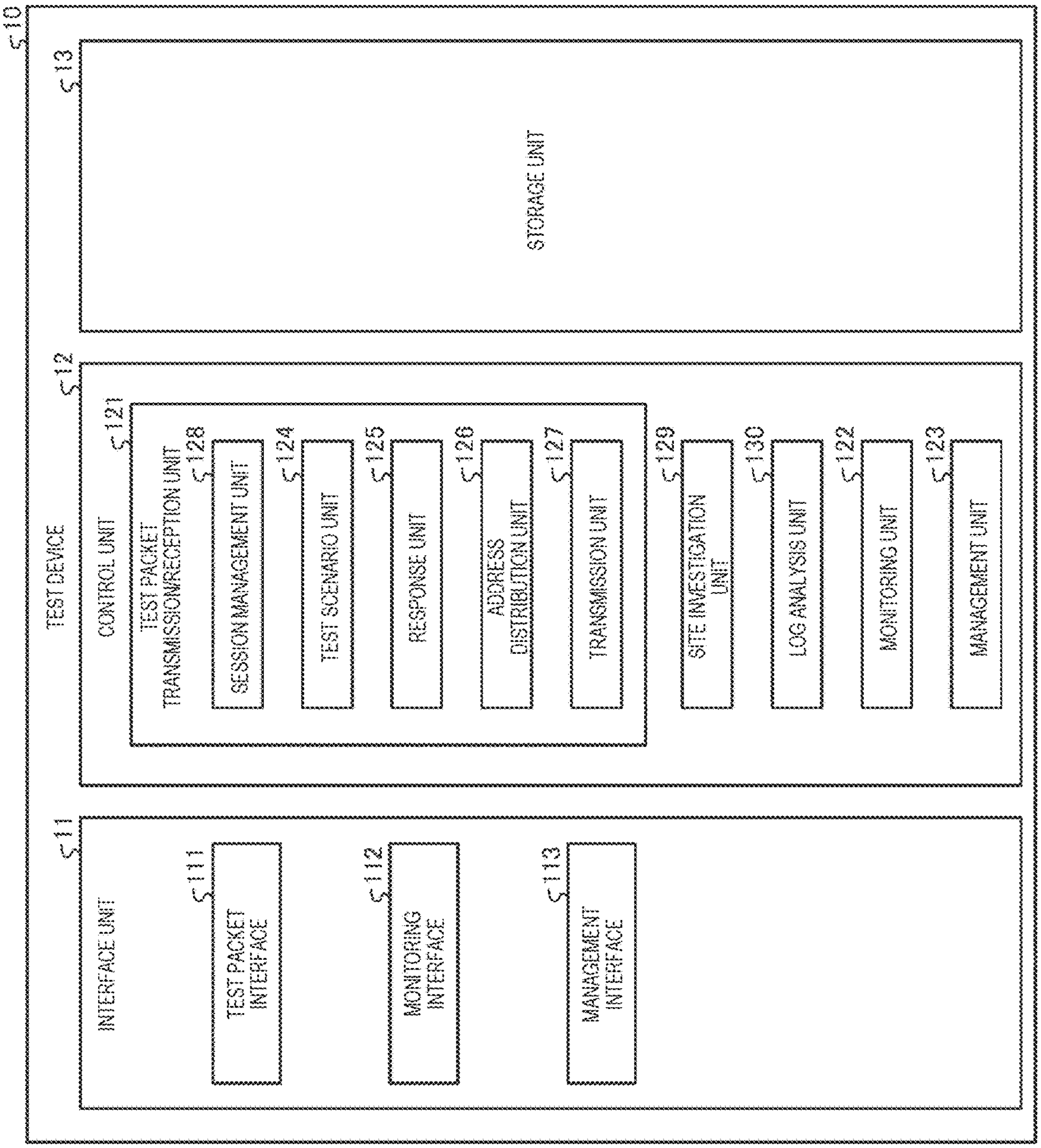
FIG. 2 is a diagram illustrating an example of a configuration of the test device according to the first embodiment.

The test device 10 includes an interface unit 11, a test packet transmission/reception unit 121, a site investigation unit 129, a log analysis unit 130, a monitoring unit 122, a management unit 123, and a storage unit 13 (see FIG. 2 to be described later).

The test packet transmission/reception unit 121 transmits a test packet for a security tolerance test to each device included in the test target system 20, and receives a packet transmitted from the test target system 20 for the test packet. The monitoring unit 122 monitors a load status of each device of the test target system 20. In addition, the management unit 123 performs settings related to the test packet transmission/reception unit 121 and the monitoring unit 122, and acquires and analyzes information.

For example, in the example of FIG. 1, the test packet transmission/reception unit 121 and the monitoring unit 122 are executed by the test device 10 according to the setting of the management unit 123. Note that, for example, the test device 10 may be distributed, and the test packet transmission/reception unit 121, the monitoring unit 122, and the management unit 123 may be distributed and executed by a plurality of test devices.

In addition, before the test packet transmission/reception unit 121 sends out the test packet, the site investigation unit 129 accesses the test target system 20 by simulating a web browser and ascertains the server configuration of the test target. Note that details of the processing of the site investigation unit 129 will be described later.

Here, the test device 10 will be described with reference to FIG. 2. FIG. 2 is a diagram illustrating an example of a configuration of the test device according to the first embodiment. As illustrated in FIG. 2, the test device 10 includes the interface unit 11, a control unit 12, and the storage unit 13.

The interface unit 11 is an interface that performs communication control with other devices. For example, the interface unit 11 transmits and receives packets to and from other devices via a network. The interface unit 11 is a network interface card such as a LAN card, for example.

The interface unit 11 includes a test packet interface 111, a monitoring interface 112, and a management interface 113. The test packet interface 111 transmits and receives packets accompanying the execution of the test packet transmission and reception function. In addition, the monitoring interface 112 transmits and receives packets accompanying the execution of the monitoring unit 122 of the test device 10. In addition, the management interface 113 transmits and receives packets accompanying the execution of the management unit 123 of the test device 10.

The control unit 12 controls the entire test device 10. Here, the control unit 12 is, for example, an electronic circuit such as a central processing unit (CPU), a micro processing unit (MPU), or a graphical processing unit (GPU), or an integrated circuit such as an application specific integrated circuit (ASIC) or a field programmable gate array (FPGA). The control unit 12 includes the test packet transmission/reception unit 121, the monitoring unit 122, the management unit 123, the site investigation unit 129, and the log analysis unit 130. Note that the monitoring unit 122 is an example of a monitoring unit.

The test packet transmission/reception unit 121 includes a test scenario unit 124, a response unit 125, an address distribution unit 126, a transmission unit 127, and a session management unit 128.

The session management unit 128 manages session information of a test packet for increasing a processing load on the server 23. Specifically, the session management unit 128 acquires session information for constructing a session with the server 23 of the test target device protected by the security device 22 that authenticates the packet. For example, when the own test device operates as a representative of a plurality of test devices, the session management unit 128 acquires the session information from the server 23 of the test target device and transmits the session information to another test device, and when the own test device is not the representative, the session management unit 128 receives the session information from a representative test device.

Specifically, the session management unit 128 performs authentication processing such as login in advance with the test target system 20 such as a web server, and acquires a cookie containing session information from a packet received from the server 23. Then, when the own test device 10 operates as a representative of a plurality of test devices, the session management unit 128 transmits the cookie acquired from the server 23 to the session management units 128 of the plurality of other test devices. In addition, when the own test device 10 is not a representative of the plurality of test devices, the session management unit 128 receives the cookie from a representative test device and applies the cookie to the test packet to be transmitted.

In addition, for example, when the own test device operates as the representative of the plurality of test devices, the session management unit 128 acquires the session information from the server 23 of the test target device again before an effective period of the session information ends based on the effective period, and transmits the session information to another test device. That is, the session management unit 128 logs in to the server 23 again before the effective period ends based on the effective period of the session information and acquires a cookie, thereby performing an attack test from the test target system 20 on the web page that can be displayed only after login while minimizing the login processing to the server 23 within the effective period of the session information.

The test scenario unit 124 constructs a test session with the server 23 according to a scenario based on test settings specified by the site investigation unit 129, and generates the test packet. Specifically, the test scenario unit 124 generates the test packet for executing login, search, or the like for the server 23 according to the scenario by using at least one of an URL, a query, and an attack type with which there is a high likelihood that an attack will succeed, which is specified by the site investigation unit 129, and generates a test packet according to a cookie received from the server 23 to transmit the test packet maintaining the session information.

For example, the test scenario unit 124 constructs HTTP and HTTPS sessions with the test target system 20 such as a web server according to a scenario described using a script or the like, and then generates a test packet for the test target system 20. In addition, in order to transmit a test packet that maintains session information such as login information, the test scenario unit 124 generates a test packet according to the cookie received from the server 23 or the representative test device.

As a test packet, in addition to GET and POST Flood, the test scenario unit 124 not only performs an attack test of creating/deleting a plurality of accounts to the server 23, frequent login/logout from a plurality of accounts, and frequent search execution, but also performs an attack test of changing a TCP header such as Slow READ on the maintained session.

The response unit 125 makes a response such that the test packet is authenticated as valid by the security device 22 with respect to a response request up to authentication of a predetermined stage among a plurality of stages of authentication performed by the security device (security system) 22. Specifically, each time a response request corresponding to the authentication up to a predetermined stage is received, the response unit 125 identifies the received response request, and responds to the identified response request such that the test packet is authenticated as valid by the security system. For example, the response unit 125 receives a response request corresponding to TCP authentication, HTTP authentication, and challenge response authentication performed by the security device 22, identifies the received response request, and makes a response that adapts to the identified response request, that is, a response such that the attack packet is authenticated as valid by the security device 22.

The address distribution unit 126 constructs the packet such that the test packet uses a plurality of source IP addresses. As a result, the address distribution unit 126 distributes the source IP address of the test packet to be transmitted according to the list of IP addresses set in advance. As an example, the address distribution unit 126 allocates different source IP addresses according to the IP address list to a TCP SYN packet transmitted as a test packet, and uses the same source IP address in the subsequent same TCP connection, thereby performing communication with different source IP addresses for a plurality of TCP connections.

In addition, when a packet filter threshold value of the test target system is notified of by the monitoring unit 122, the address distribution unit 126 controls the number of source IP addresses and adjusts the test packet transmission per source IP address so as not to correspond to the packet filter threshold value of the test target system.

The transmission unit 127 transmits a test packet for increasing the processing load to the server 23 protected by the security device 22 that authenticates the packet transmitted to the device to be protected. Furthermore, for example, the transmission unit 127 may transmit a packet generated by an operation of the web browser together with the test packet to the server 23 of the test target device.

For example, when the security device 22 has a packet discard function based on a packet signature at the time of transmitting the test packet, the transmission unit 127 sets packet information of a user agent or the like to be the same as that of a general browser in order to prevent the packet from being discarded by determining that the packet is not the general browser based on the packet information of the user agent or the like. As an example, a packet transmission function of a general browser may be used.

The site investigation unit 129 accesses a test target site managed by the server 23 to acquire information on the test target site, and specifies test settings for increasing the processing load of the server 23 based on the information. Specifically, the site investigation unit 129 accesses the test target site by simulating a web browser, acquires information of a site configuration including an application and a file used in the test target site, and specifies at least one of an URL, a query, and an attack type with which there is a high likelihood that an attack for increasing a processing load will succeed as the test settings for increasing the processing load of the server 23.

Hereinafter, a method by which the site investigation unit 129 acquires information of a site configuration will be specifically described. First, the site investigation unit 129 extracts, for example, a remote IP address of a response packet and performs reverse DNS search to specify whether a domain of a commercial cloud service or a security instrument is a domain of the test target site.

Next, the site investigation unit 129 specifies, for example, the presence or absence of a dynamic file not to be cached, such as an URL at which a GET request or a POST request can be performed, an URL for which file upload is possible, or creation for each logged-in user, and acquires a web server type or the like from the server information in the response header of the response packet.

Then, for example, the site investigation unit 129 specifies a file in the web server, extracts a file having a large size that is not cached, and measures a timeout value and a session duration by simulating a low-speed line. Further, the site investigation unit 129 specifies, for example, from a response packet from a login ID, a password, and a search page, whether or not another company's commercial service is used in reverse DNS search, validation processing contents, and the like from the packet contents. The response speed associated with these processes is also specified.

Subsequently, processing of transmitting a test setting to the test packet transmission/reception unit 121 so that the test packet transmission/reception unit 121 can execute a test using an URL, a query, and an attack type with which there is a high likelihood that an attack for increasing the processing load of a website will succeed will be specifically described. For example, when the remote IP address of the response packet is the domain of the test target site, the site investigation unit 129 specifies that the test setting for executing a large amount of packet test not using HTTP, such as SYN Flood, by using a transmission destination IP address as the remote IP address is an attack type with which there is a high likelihood that an attack for increasing the processing load of the website will succeed, and transmits the test setting to the test packet transmission/reception unit 121.

In addition, for example, as a test using HTTP, the site investigation unit 129 may transmit, to the test packet transmission/reception unit 121, a slow READ test setting reflecting a timeout value and the maximum number of web server connections for a file URL having a large size that is not cached.

In addition, for example, the site investigation unit 129 specifies an URL for which file upload is possible or an URL for which POST is permitted as an URL with which there is a high likelihood that the attack will succeed, and transmits, to the test packet transmission/reception unit 121, a slow POST test setting and a POST test setting reflecting a timeout value and the maximum number of web server connections with respect to the URL for which file upload is possible or the URL for which POST is permitted.

Furthermore, for example, when there is a login page or a search page, the site investigation unit 129 specifies a query condition having the longest response time in the validation, and transmits a login test setting and a search test setting to the test packet transmission/reception unit 121 under the query condition. Then, for example, the site investigation unit 129 transmits, to the test packet transmission/reception unit 121, a Slowloris test setting and a GET test setting reflecting the timeout value and the maximum number of web server connections with respect to the URL that allows GET.

For example, the site investigation unit 129 may set the query basically at random. When the remote IP address of the response packet is in another domain, the setting is transmitted to the test packet transmission/reception unit 121 after the test performer determines whether to execute each test. Through these processes, the test packet transmission/reception unit 121 can execute a test using an URL, a query, and an attack type with which there is a high likelihood that an attack for increasing the processing load of a website will succeed while avoiding an influence on another company's service.

The monitoring unit 122 monitors a packet filter status and a processing load status of the security device 22 or the server 23 to which the attack packet authenticated as valid by the security device 22 is transmitted. Then, the monitoring unit 122 analyzes the correlation between the type and amount of the test packet and the packet filter status and the processing load status, and ascertains the test packet amount for avoiding the packet filter and the authentication function with a high processing load.

The monitoring unit 122 monitors the number of test packets, the byte amount, and the number of sessions per unit time in units of source IP addresses, and the response packet from the test target system as the monitoring of the packet filter status, and ascertains the source IP address that comes to receive no response packet even if it is transmitting a test packet, although other source IP address test packets receive a response packet. The monitoring unit 122 records, as the packet filter threshold value of the test target system, the number of test packets, the byte amount, the number of sessions, and the time stamp that are transmitted at the time immediately before the relevant source IP address comes to receive no response packet and notifies the control unit 12 of those values.

After the test, the log analysis unit 130 analyzes the log from each device on the path through which the test traffic including the test target site flowed. For example, after the test, the log analysis unit 130 collects logs from each device on the path through which the test traffic including the test target site flowed, and checks the response of each device to the test packet, thereby analyzing whether the processing load is increased or whether the normal packet is involved and discarded.

The storage unit 13 stores various types of information used in execution of the control unit. For example, the storage unit 13 is a semiconductor memory element such as a random access memory (RAM) or a flash memory, or a storage device such as a hard disk or an optical disc.

According to the test device 10, the packet load test of each device included in the test target system 20 can be performed. Here, the packet load test performed by the test device 10 will be described by taking a case where the packet load test of the security device 22 and the server 23 is performed as an example.

In the test target system 20, when a packet is transmitted to the server 23, the security device 22 allows normal browser communication to pass and blocks an attack packet by a Bot or an attack tool. For example, when detecting transmission of a packet to the server 23, the security device 22 makes an authentication request for the relevant packet. For example, TCP authentication, HTTP authentication, and challenge response authentication are performed. Further, the security device 22 monitors the number of packets, the byte amount, the number of sessions, and the like per unit time in units of source IP addresses, and registers the source IP address in a blacklist when a predetermined threshold value is exceeded. This is based on the fact that the source of the packet is a general browser operated by a person, and a response that adapts to the response request is made by the person who operates the general browser, and that the number of packets and the byte amount per unit time transmitted by the general browser operated by a person do not correspond to the predetermined threshold value.

In addition, simple packet transmission such as SYN Flood or GET Flood in order to test the processing load on the server 23 may only measure a processing load of a part of server processing against a denial-of-service attack.

In the conventional method, in the case of a test target device that requires login authentication, when a web page that can be accessed only after login is tested, login processing is required for each test session, and there is a problem that not only the test target web page but also a load of the login page is added. In addition, if the login page is monitored, the entire website can be protected, and there is a problem that even if a web page that can be accessed only after login has a trouble, it is difficult to find the trouble.

As a result, in the conventional attack tool for the packet load test, it is difficult to perform the packet load test for measuring the processing load of each stage of the web page that can be accessed only after login in the server 23 or the security device 22.

Figure 3:
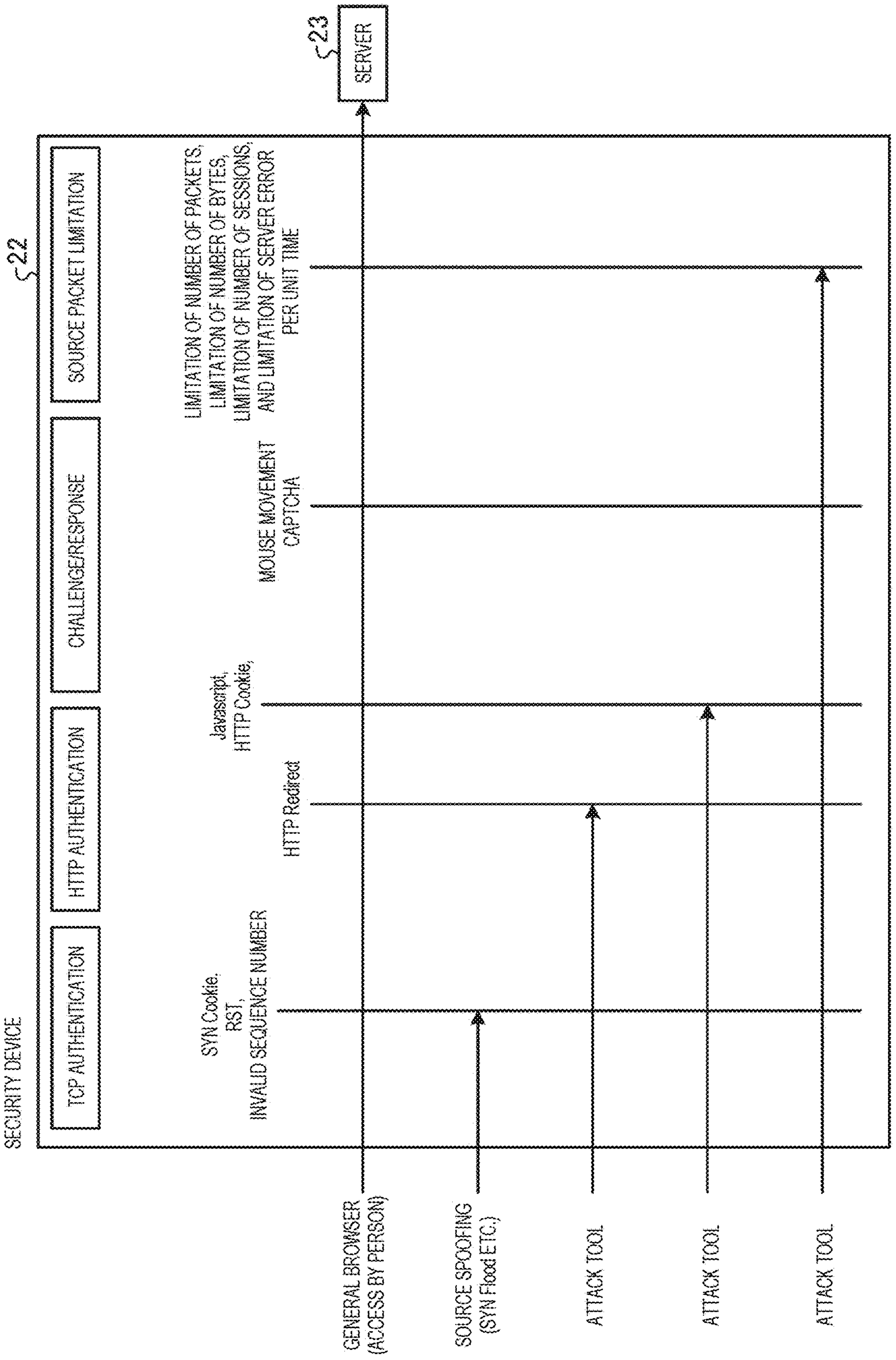
FIG. 3 is a diagram for describing a multi-stage protect function.

First, a multi-stage protect function will be described with reference to FIG. 3. FIG. 3 is a diagram for describing a multi-stage protect function. As illustrated in FIG. 3, when a packet is transmitted to the server 23, the security device 22 needs to limit the number of source packets and perform authentication at a plurality of stages. The security device 22 performs, for example, TCP authentication, HTTP authentication, challenge response authentication, limitation of the number of source packets per unit time, limitation of the number of source bytes per unit time, and limitation of the number of sessions per unit time.

For example, when the transmission of the packet to the server 23 is detected, the security device 22 monitors the number of packets, the number of sessions, and the like for each source IP address with respect to the relevant packet, and if the source of the packet clears a threshold value based on the number of packets, the number of sessions, and the like transmitted by a general browser operated by a person, the security device allows the packet to pass the function of limiting the number of source packets. For example, when the threshold value to be passed is set to 6 packets/second or less and 6 sessions or less, the security device 22 determines that the source IP address satisfying the threshold value to be passed is communication from the general browser and allows the source IP address to pass.

On the other hand, when the transmitted packet is intended for a SYN Flood attack by a spoofed source, the security device 22 discards the relevant packet at the TCP authentication stage. Therefore, even when a packet is transmitted by the attack tool that is intended for the packet load test of the server 23, the security device 22 detects that the transmission of the relevant packet is an attack at a predetermined stage and discards the relevant packet. Furthermore, even when there is an attack tool capable of responding to TCP authentication, HTTP authentication, and challenge/response, the relevant source IP address is registered in the blacklist and the packet is discarded by being determined as an attack by the limitation of the number of packets, the limitation of the number of bytes, and the limitation of the number of sessions per unit time due to the source packet limitation. As a result, in the conventional attack tool that is intended for the packet load test, it is difficult to perform the packet load test of the server 23 or the security device 22.

Figure 4:
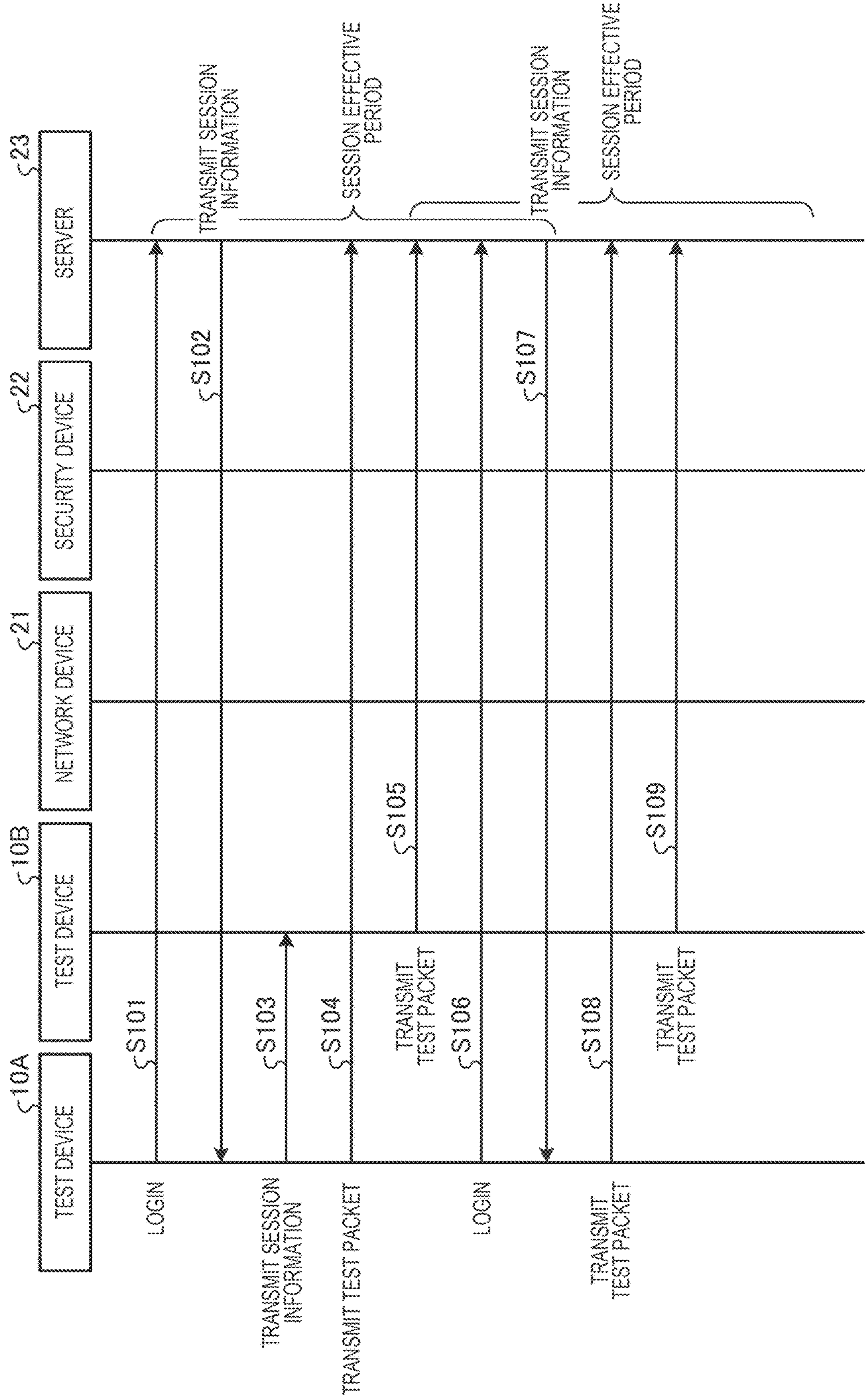
FIG. 4 is a sequence diagram for describing a packet load test by the test device according to the first embodiment.

On the other hand, with the test device 10 according to the first embodiment, the packet load test of the server 23 or the security device 22 can be appropriately performed. Here, an operation when the test device 10 performs the packet load test of the server 23 or the security device 22 will be described with reference to FIG. 4. In the example of FIG. 4, a test device that operates as a representative is described as a test device 10A, and a test device that is not a representative is described as a test device 10B. In addition, it is assumed that before the packet load test, the test device 10 accesses the test target system 20 in advance by simulating a web browser and ascertains the server configuration of the test target.

FIG. 4 is a sequence diagram for describing a packet load test by the test device according to the first embodiment. First, the test device 10 performs authentication processing such as login to the server 23 that is the test target device in advance (step S101). Subsequently, when the authentication processing such as login is successful, the server 23 transmits session information to the test device 10 (step S102).

Then, the test device 10A acquires a cookie containing the session information from the packet received from the test target device, and transmits the session information (cookie) acquired from the server 23 to the session management unit of another test device 10B (step S103). Then, the test device 10B receives the cookie from the representative test device 10A and applies the cookie to the test packet to be transmitted.

Next, the test devices 10A and 10B set the attack packet and the monitoring based on the test setting. At this time, the test devices 10A and 10B perform setting such that, for example, after HTTP connection, a large number of logins are made to the server and test packets for performing a large number of searches are transmitted as test packets. In addition, as the monitoring, the test devices 10A and 10B perform setting such that, for example, response confirmation to ping or traceback of the server 23 or HTTP response confirmation is performed.

In addition, the test devices 10A and 10B monitor the number of test packets, the byte amount, and the number of sessions per unit time in units of source IP addresses, and the response packet from the test target system as the monitoring of the packet filter status, and ascertain the source IP address that comes to receive no response packet even if it is transmitting a test packet, although other source IP address test packets receive a response packet. The test devices 10A and 10B perform setting so as to record, as the packet filter threshold value of the test target system, the source IP address that comes to receive no response packet, the number of test packets, the byte amount, the number of sessions, and the time stamp, which are transmitted at the time immediately before the relevant source IP address comes to receive no response packet, and to notify the control unit of those values.

Then, the transmission unit 127 of each of the test devices 10A and 10B transmits a test packet from the test packet interface 111 (steps S104 and S105). At this time, first, the transmission unit 127 transmits a TCP SYN packet to 10.0.0.1, which is the IP address of the server 23, in order to establish a TCP connection with the server 23. Thereafter, the test device 10A performs authentication processing such as login again to the test target device again before the effective period ends based on the effective period of the session information (step S106). Then, when the authentication processing such as login is successful, the server 23 transmits session information to the test device 10 (step S107). Then, the transmission unit 127 of each of the test devices 10A and 10B transmits a test packet from the test packet interface 111 in the same manner as the above-described processing (steps S108 and S109).

Upon receiving the SYN packet from the test devices 10A and 10B, the security device 22 makes a TCP authentication response request to determine whether or not the SYN packet transmitted to the server 23 is an attack packet. When the TCP connection is established, a SYN/ACK packet is transmitted to the source of the SYN packet.

Here, for example, it is known that even when an invalid packet is transmitted to a SYN packet, the attack tool takes an action of transmitting the SYN packet again without making a response that adapts to the invalid packet. Therefore, when the TCP authentication is performed, for example, the security device 22 transmits an invalid packet such as a SYN/ACK packet containing a cookie, a SYN/ACK packet containing an invalid ACK sequence number, an ACK packet, or an RST packet to the test device 10. Then, when a response that adapts to the transmitted invalid packet is returned, the security device 22 allows the SYN packet to pass the TCP authentication.

Here, the response unit 125 makes a response that adapts to the TCP authentication response request to the security device 22. For example, when a SYN/ACK packet containing a cookie is transmitted to the SYN packet, the response unit 125 identifies that the relevant packet is a SYN/ACK packet containing a cookie. Then, the response unit 125 transmits the ACK packet in which the sequence number based on the content of the relevant cookie is set to the security device 22. Note that it is conceivable that the attack tool that is intended for the SYN Flood attack does not make any response even when the SYN/ACK packet containing the cookie is transmitted from the security device 22.

As a result, the test device 10 can establish a TCP connection with the server 23, and can prevent the test packet transmitted by the transmission unit 127 from being discarded at the TCP authentication stage. Then, the test device 10 can perform a packet load test on the security device 22 or the server 23 when performing authentication at a stage prior to the TCP authentication.

When the TCP connection is established, the transmission unit 127 transmits an HTTP request packet to the server 23. The security device 22 makes an HTTP authentication response request to determine whether or not the HTTP request packet transmitted to the server 23 is a test packet.

Here, the response unit 125 makes a response that adapts to HTTPS authentication to the security device 22. For example, the response unit 125 identifies that the response from the security device 22 is a redirect response. Then, the response unit 125 transmits the HTTP request packet to a redirect destination designated by a value such as a uniform resource identifier (URI) indicated by a location header of the redirect response. Note that it is conceivable that an attack tool that does not make a response that adapts to the redirect response does not refer to the location header and does not transmit the HTTP request packet to the redirect destination.

Further, the security device 22 makes an HTTP authentication response request using an HTTP cookie or JavaScript (registered trademark) to determine whether or not the HTTP request request packet transmitted to the server 23 is an attack packet.

When the HTTP authentication is performed using an HTTP cookie or JavaScript, for example, the security device 22 requests the test device 10 to execute a process of reading the content described in a cookie by a program described in JavaScript and returning the read result. Then, when the execution result of the relevant program is returned within a predetermined time, the security device 22 allows the HTTP request packet to pass the HTTP authentication.

Here, the response unit 125 makes a response that adapts to HTTP authentication using an HTTP cookie or JavaScript to the security device 22. For example, the response unit 125 identifies that the data transmitted from the security device 22 is a JavaScript execution instruction. Then, the response unit 125 notifies the security device 22 of the content described in the cookie obtained as a result of executing the program described in JavaScript. Note that it is conceivable that an attack tool that does not make a response that adapts to HTTP authentication by JavaScript and cookie does not make any response to HTTP authentication by an HTTP cookie or JavaScript.

As a result, the test device 10 can pass the HTTP authentication, and can prevent the attack packet transmitted by the transmission unit 127 from being discarded at the HTTP authentication stage. Then, the test device 10 can perform a packet load test on the security device 22 or the server 23 when performing authentication at a stage prior to the HTTP authentication.

Furthermore, when the HTTP authentication is performed, the transmission unit 127 transmits an HTTP request packet to the server 23. The security device 22 makes a challenge response authentication response request to determine whether or not the HTTP request packet transmitted to the server 23 is an attack packet.

When challenge response authentication is performed, the security device 22 requests, for example, the test device 10*b* to perform a mouse movement on a predetermined path or the completely automated public Turing test to tell computers and humans apart (CAPTCHA). Then, when a response that adapts to the mouse movement or CAPTCHA is returned, the security device 22 allows the HTTP request packet to pass authentication by challenge response authentication.

Here, the response unit 125 makes a response that adapts to challenge response authentication to the security device 22. For example, the response unit 125 identifies that the mouse movement path is indicated by the security device 22. Then, the response unit 125 reads the path indicated as the mouse movement path, and transmits the same signal as the signal generated when the mouse is moved along the read path to the security device 22.

In addition, the response unit 125 identifies that the CAPTCHA is indicated by the security device 22. Then, the response unit 125 transmits data obtained by converting the CAPTCHA into text using an image-to-text conversion service, OCR, or the like to the security device 22. Note that it is conceivable that an attack tool that does not make a response that adapts to challenge response authentication does not make any response to mouse movement or challenge response authentication by CAPTCHA.

As a result, the test device 10 can pass the challenge response authentication, and can prevent the test packet transmitted by the transmission unit 127 from being discarded at the challenge response authentication stage. Then, the test device 10 can perform a packet load test on the server 23.

By increasing the source IP address of the test packet that can be transmitted from the single test device 10, it is possible to simulate a denial-of-service attack from a plurality of attack sources, and it is possible to transmit the test packet from a plurality of IP addresses without preparing a plurality of control units of the test device, thereby reducing test resources. For example, when the test packet to be transmitted is a TCP SYN packet, the address distribution unit 126 sequentially allocates a source IP address different from the previous TCP SYN packet according to the IP address list set from the management unit 123 and allocates the same source IP address to the relevant TCP connection, so that the test packet can be transmitted using a plurality of source IP addresses while maintaining the IP address consistency of the TCP connection.

The monitoring unit 122 monitors and analyzes the packet filter status of the test packet in the test target system 20 for the test packet and the response packet to the test packet from the test target system 20 transmitted from the test device 10. The monitoring unit 122 monitors the number of test packets, the byte amount, and the number of sessions per unit time in units of source IP addresses, and the response packet from the test target system as the monitoring of the packet filter status, and ascertains the source IP address that comes to receive no response packet even if it is transmitting a test packet, although other source IP address test packets receive a response packet. The monitoring unit 122 performs setting so as to record, as the packet filter threshold value of the test target system 20, the source IP address that comes to receive no response packet, the number of test packets, the byte amount, the number of sessions, and the time stamp, which are transmitted at the time immediately before relevant source IP address comes to receive no response packet, and to notify the control unit 12 of those values.

When a packet filter threshold value of the test target system 20 is notified of by the monitoring unit 122, the address distribution unit 126 of the control unit 12 controls the number of source IP addresses and adjusts the test packet transmission per source IP address so as not to correspond to the packet filter threshold value of the test target system. For example, transmission from the source IP address that comes to receive no response packet and is determined to be packet filtered is stopped for a certain period of time, a test packet is transmitted from a new source IP address that has not yet been packet filtered, and packet transmission in units of source IP addresses is narrowed to a range that does not correspond to the packet filtering.

As a result, the test device 10 can pass the source packet limitation illustrated in FIG. 3, and can prevent the test packet transmitted by the transmission unit 127 from being discarded at the source packet limitation stage. Then, the test device 10 can perform a packet load test on the server 23.

As a packet load test for the server 23, simple packet transmission such as SYN Flood or GET Flood can only measure a processing load of a part of server processing against a denial-of-service attack. Therefore, the test scenario unit 124 constructs HTTP and HTTPS sessions with the test target system 20 such as a web server according to a scenario described using a script or the like, and then generates a test packet according to the cookie received from the server 23 in order to transmit a test packet maintaining session information such as login information to the server 23. As a test packet, in addition to GET and POST Flood, not only an attack test of creating/deleting a plurality of accounts to the server 23, frequent login/logout from a plurality of accounts, and frequent search execution is performed, but also an attack test of changing a TCP header such as Slow READ on the maintained session is performed.

As a result, not only a simple server processing load such as an HTTP GET packet processing load and an HTTP POST packet processing load is measured for the server 23, but also a load test such as a login information encryption and decryption processing load, a search processing load, and a database processing load of the server 23 can be performed.

On the other hand, the monitoring unit 122 makes a monitoring response request to the server 23. For example, the monitoring unit 122 confirms a response to ping or traceback of the server 23 or confirms an HTTP response according to the setting by the test device 10.

Then, the server 23 responds to the monitoring response request while processing the attack packet. Then, the monitoring unit 122 transmits the monitoring result from the monitoring interface 112 to the test device 10.

Further, the test device 10 analyzes the monitoring result and instructs the test device 10 to change the scenario as necessary. Specifically, the test device 10 analyzes the response time and the response content of the server 23 while correlating the received monitoring result with the test traffic that is the type and amount of attack packets. The response time change and the response message of the server 23, the test traffic content when there is no response, the test traffic content when the response is restored, and the like are recorded and analyzed in time series, and a function with a high processing load is ascertained.

As a scenario change, for example, the management unit 123 changes the amount of test packets transmitted by the transmission unit 127 according to the status of the processing load of the security device 22 or the server 23. Specifically, when the processing load of the security device 22 or the server 23 is a predetermined load or more, the management unit 123 increases the amount of test packets transmitted to the security device 22 or the server 23 by the transmission unit 127.

Then, while the function with a high processing load is ascertained, the scenario of the test traffic is changed, and the test traffic condition that maximizes the load of the function with a high processing load is extracted from the response time change and the response message of the server 23 at that time, the test traffic content when there is no response, and the test traffic content when the response is restored. Note that the test device 10 may test and analyze a plurality of test target devices including devices other than the server 23 to ascertain a device having a high processing load from among the test target devices.

For example, as the test device 10 increases the amount of login attack packets, the processing load of the server 23 increases and the HTTP response time increases. Then, the test device 10 records the amount of attack packets at the time when the server 23 makes an HTTP 404 error response in which a web page cannot be displayed although the server 23 can connect to the server, and the amount of attack packets at the time when the server 23 cannot make a response. As a result, it is possible to ascertain the resistance of the server 23 to the login attack.

In addition, when the amount of test packets increases, the security device 22 may detect an attack, discard the relevant attack packet, and stop the increase in the processing load of the server 23. At this time, the test device 10 ascertains from the monitoring result that the processing load of the server 23 does not increase even if the attack packet to the server 23 is increased. In this case, it is possible to test whether the processing load increases by transmitting a test packet in a range that does not correspond to the packet filter threshold value from different source IP addresses by the processing of the address distribution unit 126.

Then, not only the single test device 10 but also a plurality of test devices may transmit a denial-of-service attack packet or the like to the server 23 according to the scenario. At that time, when the test device operates as a representative of a plurality of test devices, an instruction to execute/stop the test scenario in synchronization is issued to the plurality of test devices. For example, when the own test device operates as a representative of a plurality of test devices, the session management unit 128 may instruct another test device to execute or stop the scenario in synchronization. As a result, by investigating the effectiveness of countermeasures such as attack countermeasures and caches in units of a large number of source IP addresses and further performing monitoring, it is possible to ascertain a denial-of-service limitation, a bottleneck, a test traffic pattern at that time, and the like.

This determines whether the responses of the server 23 monitored by a plurality of test devices are different due to the filter setting to the test device by the network device 21, the security device 22, or the server 23 itself, or due to the load of the server 23.

Note that the test device 10 may stop the authentication halfway and perform a load test on the processing of the security device 22 at an arbitrary authentication stage. For example, the test device 10 may make a response that adapts to the TCP authentication response request by the security device 22, and then may not make a response that adapts to the HTTP authentication response request by the security device 22. As a result, the test device 10 can perform a load test on the processing of the security device 22 at the HTTP authentication stage. Similarly, the test device 10 can specify the authentication stage that is the bottleneck by performing the load test on the security device 22 at each authentication stage.

[Effects of First Embodiment] The test device 10 according to the first embodiment accesses a test target site managed by the server 23 to acquire information on the test target site, and specifies test settings for increasing a processing load of the server 23 based on the information. Then, the test device 10 manages session information of a test packet for increasing a processing load on the server 23. Subsequently, the test device 10 constructs a test session with the server 23 according to the scenario based on the specified test settings, and generates a test packet. Then, the test device 10 transmits the test packet for increasing the processing load to the server 23. Therefore, the test device 10 can ascertain the weak point and effectively perform the packet load test for each test target site. That is, the test device 10 can automatically perform a load test for effectively extracting a weak point of a test target site by using a packet of an effective attack type in which an URL or a query with which there is a high likelihood that an attack for increasing a processing load of the test target site will succeed is set.

For example, the test device 10 accesses a test target site by simulating a web browser, investigates a site configuration such as an application or a file used in the test target site, and extracts an URL, a query, and an attack type with which there is a high likelihood that an attack for increasing a processing load will succeed. Then, the test device 10 generates a test packet for executing login, search, or the like for the server 23 according to the scenario based on the extracted URL, query, and attack type. After the test, the test device 10 collects logs from each device on the path through which the test traffic including the test target site flowed, and checks the response of each device to the test packet, thereby analyzing whether the processing load is increased or whether the normal packet is involved and discarded.

In addition, the test device 10 according to the first embodiment acquires session information for constructing a session with the server 23 that is a test target device protected by the security device 22 that authenticates the packet. Then, when generating a test packet using the acquired session information and transmitting the test packet to the server 23, the test device 10 generates a test session according to a predetermined scenario and transmits a test packet for increasing a processing load to the server 23. Therefore, the test device 10 can appropriately test a test target device that requires login authentication. That is, the test device 10 according to the first embodiment can perform an attack test from the test target system on the web page that can be displayed only after login while minimizing the login processing to the server within the effective period of the session information.

In addition, when the own test device operates as a representative of a plurality of test devices, the session management unit 128 of the test device 10 according to the first embodiment acquires the session information from the server 23 and transmits the session information to another test device, and when the own test device is not the representative, the session management unit 128 receives the session information from a representative test device. Therefore, the plurality of test devices 10 can appropriately test the test target device that requires login authentication.

In addition, when the own test device operates as the representative of the plurality of test devices, the session management unit 128 of the test device 10 according to the first embodiment acquires the session information from the server 23 of the test target device again before an effective period of the session information ends based on the effective period of the session information, and transmits the session information to another test device. Therefore, the test device

10 can perform the load test from a plurality of test devices on the web page that can be displayed only after login by periodically logging in from one test device 10 once based on the session effective period.

In addition, with the test device 10 according to the first embodiment, it is possible to pass the authentication by making a response that adapts to the response request corresponding to the authentication, to avoid the packet filter in units of source IP addresses, and to perform the security tolerance test by applying a load to a plurality of places such as decryption processing and a database of the device to be tested. In addition, it is possible to specify the bottleneck by authenticating at a plurality of stages or using a plurality of devices as test targets.

In addition, each time the response unit 125 receives a response request corresponding to authentication up to an arbitrary stage of authentication performed at stages by the security device 22, the response unit identifies the received response request, and makes a response that adapts to the identified response request, that is, a response such that the test packet is authenticated as valid by the security system. As a result, the test device 10 according to the first embodiment can perform a test of the security device 22 at an arbitrary stage.

In addition, the transmission unit 127 transmits a packet generated by the operation of the web browser together with the test packet to the server 23 which is a web server. As a result, the test device 10 according to the first embodiment can perform a test in a situation close to a case where an attack is actually performed.

In addition, the management unit 123 changes the amount of attack packets transmitted by the transmission unit 127 according to the state of the processing load of the security device 22 or the server 23. As a result, the test device 10 according to the first embodiment can ascertain the operation according to the processing load of the test target device.

In addition, when the processing load of the security device 22 or the server 23 is a predetermined load or more, the management unit 123 changes the content of the test packet transmitted to the security device 22 or the server 23 by the transmission unit 127. As a result, the test device 10 according to the first embodiment can ascertain the limit of the processing load of the test target device.

[Other Embodiments] When the server 23 is a server other than a web server such as a DNS server, or when the network device 21 or the security device 22 is investigated, the test device transmits a denial-of-service attack packet and a normal packet according to a protocol and an application serviced by the test target device. At this time, the security device 22 may transmit a request such as DNS authentication such as a TCP retransmission request, but the test device transmits a packet according to the request. As a result, even when additional authentication is performed, security tolerance investigation and bottleneck investigation of the test target device can be advanced.

[System Configuration and Others] In addition, each component of each device that has been illustrated is functionally conceptual, and is not necessarily physically configured as illustrated. That is, a specific form of distribution and integration of individual apparatuses is not limited to the illustrated form, and all or a part of the configuration can be functionally or physically distributed and integrated in any unit according to various loads, usage conditions, and the like. Furthermore, all or any part of each processing function performed in each device can be realized by a CPU and a program analyzed and executed by the CPU, or can be realized as hardware by a wired logic.

Further, among the individual processes described in the present embodiment, all or some of the processes described as being automatically performed can be manually performed, or all or some of the processes described as being manually performed can be automatically performed by a known method. In addition, the processing procedure, the control procedure, the specific name, and the information including various data and parameters that are illustrated in the document and the drawings can be freely changed unless otherwise specified.

[Program] In addition, it is also possible to create a program in which the processing executed by the test device described in the embodiment described above is described in a language that can be executed by a computer. For example, it is also possible to create a program in which the processing executed by the test device according to the embodiment is described in a language that can be executed by a computer. In this case, the computer executes the program, and thus the effects similar to those of the embodiment described above can be obtained. Hereinafter, an example of a computer that executes a program will be described.

Figure 5:
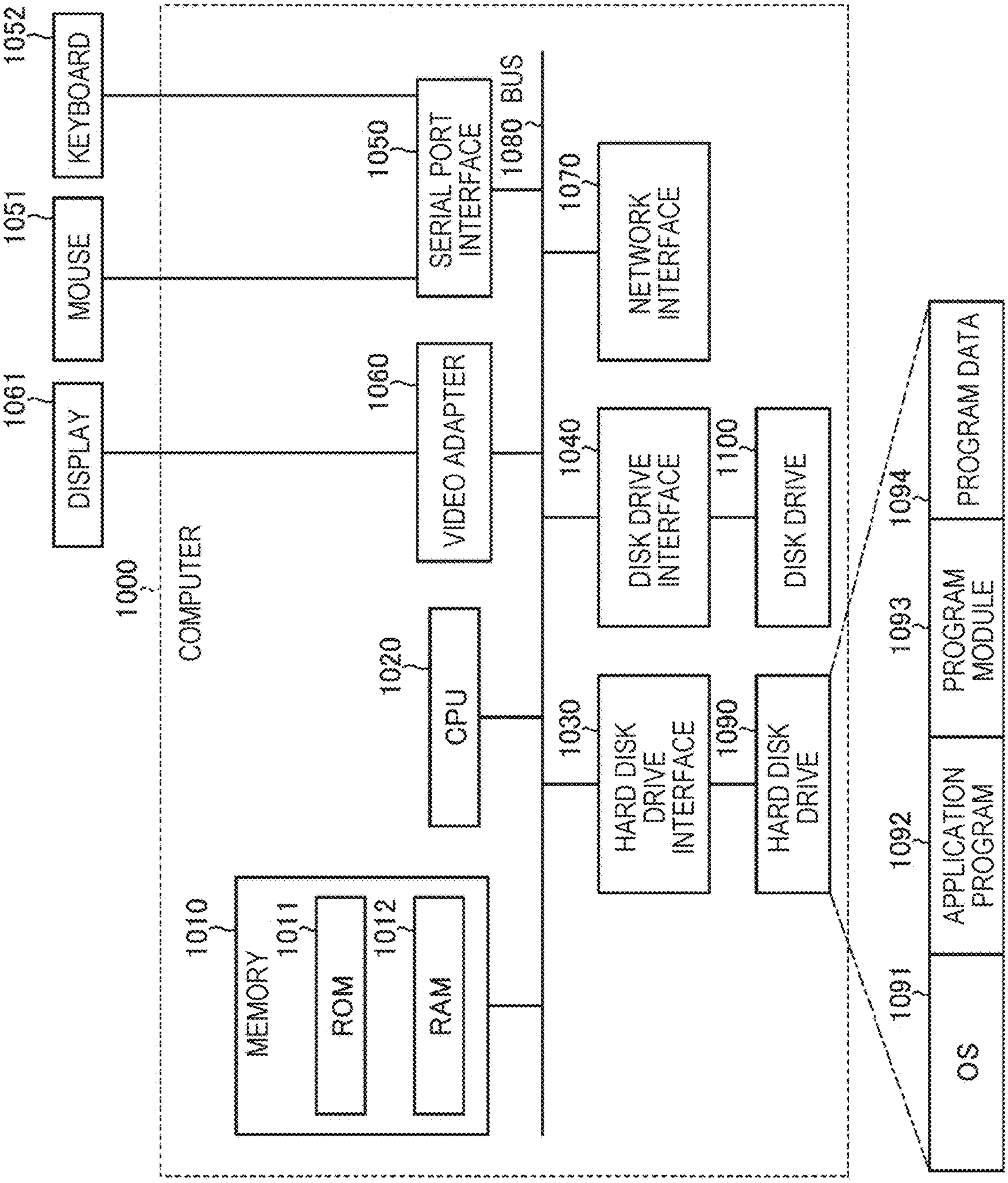
FIG. 5 is a diagram illustrating a computer that executes a program.

FIG. 5 is a diagram illustrating a computer that executes a program. A computer 1000 includes, for example, a memory 1010 and a CPU 1020. Further, the computer 1000 also includes a hard disk drive interface 1030, a disk drive interface 1040, a serial port interface 1050, a video adapter 1060, and a network interface 1070. These units are connected to each other by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1051 and a keyboard 1052. The video adapter 1060 is connected to, for example, a display 1061.

The hard disk drive 1090 stores, for example, an OS 1091, an application program 1092, a program module 1093, and program data 1094. That is, the program that defines the individual processes of each device is implemented as the program module 1093 in which a code that can be executed by a computer is described. The program module 1093 is stored in, for example, the hard disk drive 1090. For example, the program module 1093 for executing the same processing as the functional configuration in the device is stored in the hard disk drive 1090. Note that the hard disk drive 1090 may be replaced with a solid state drive (SSD).

Furthermore, the data used in the processing of the above-described embodiment is stored, for example, in the memory 1010 or the hard disk drive 1090 as the program data 1094. Then, the CPU 1020 reads the program module 1093 and the program data 1094 stored in the memory 1010 or the hard disk drive 1090 to the RAM 1012, and executes the program module 1093 as necessary.

Note that the program module 1093 and the program data 1094 are not limited to being stored in the hard disk drive 1090, and may be stored in, for example, a detachable storage medium and read by the CPU 1020 via the disk drive 1100 or the like. Alternatively, the program module 1093 and the program data 1094 may be stored in another computer connected via a network or a WAN. Then, the program module 1093 and the program data 1094 may be read by the CPU 1020 from another computer via the network interface 1070.

REFERENCE SIGNS LIST

1 Network
10 Test device
11 Interface unit
12 Control unit
13 Storage unit
20 Test target system
21 Network device
22 Security device
23 Server
111 Test packet interface
112 Monitoring interface
113 Management interface
121 Test packet transmission/reception unit
122 Monitoring unit
123 Management unit
124 Test scenario unit
125 Response unit
126 Address distribution unit
127 Transmission unit
128 Session management unit
129 Site investigation unit
130 Log analysis unit

The invention claimed is:

1. A test device comprising:
a memory configured to store computer-readable instructions; and
processing circuitry coupled to the memory and, when executing the computer-readable instructions is configured to:
access a test target site managed by a test target device to acquire information on the test target site, and specify test settings to increase a processing load of the test target device based on the information;
manage session information corresponding to a test packet to increase a processing load on the test target device;
construct a test session with the test target device according to a scenario based on the test settings specified, and generate the test packet; and
transmit the test packet to increase the processing load to the test target device,
wherein, when the test device operates on behalf of a plurality of test devices, the processing circuitry is further configured to acquire session information from the test target device and transmit the session information to another test device, and when the test device is not operating on behalf of the plurality of test devices, the processing circuitry is further configured to receive the session information from a representative test device of the plurality of test devices.

2. The test device according to claim 1, wherein the processing circuitry is further configured to access the test target site by simulating a web browser, acquire information of a site configuration including an application and a file used in the test target site, and specify at least one of an URL, a query, and an attack type to increase the processing load as one of the test settings.

3. The test device according to claim 2, wherein the processing circuitry is further configured to generate the test packet for the test target device according to the scenario by using at least one of an URL, a query, and an attack type, and generate a test packet according to a cookie received from the test target device to transmit the test packet.

4. The test device according to claim 1, wherein the processing circuitry is further configured to:
construct the test packet such that the test packet uses a plurality of source IP addresses,
respond to a response request for authentication among a plurality of stages of authentication performed by a security device such that the security device authenticates the test packet as valid,
monitor a packet filter status and a processing load of the security device to which the test packet is transmitted, analyze a correlation between a type and an amount of the test packet and the packet filter status and a processing load status, and ascertain a test packet amount for avoiding a packet filter and an authentication function with a high processing load, and
analyze a log from each device on a path through which test traffic including the test target site flowed after a test.

5. The test device according to claim 1, wherein, when the test device operates on behalf of the plurality of test devices, the processing circuitry is further configured to acquire the session information from the test target device before an effective period of the session information ends, and transmit the session information to another test device.

6. The test device according to claim 1, wherein the test packet is one of a GET, POST, or FLOOD packet.

7. A test method executed by a test device, the test method comprising:
accessing a test target site managed by a test target device to acquire information on the test target site, and specifying test settings to increase a processing load of the test target device based on the information;
managing session information corresponding to a test packet to increase a processing load on the test target device;
constructing a test session with the test target device according to a scenario based on the test settings specified, and generating the test packet; and
transmitting the test packet to increase the processing load to the test target device,
wherein, when the test device operates on behalf of a plurality of test devices, the test method further includes acquiring session information from the test target device and transmitting the session information to another test device, and when the test device is not operating on behalf of the plurality of test devices, the test method further includes receiving, by the test device, the session information from a representative test device of the plurality of test devices.

8. A non-transitory computer-readable recording medium storing therein a test program that causes a processor of a test device to execute a process comprising:
accessing a test target site managed by a test target device to acquire information on the test target site, and specifying test settings to increase a processing load of the test target device based on the information;
managing session information corresponding to a test packet to increase a processing load on the test target device;
constructing a test session with the test target device according to a scenario based on the test settings specified, and generating the test packet; and
transmitting the test packet to increase the processing load to the test target device, wherein, when the test device operates on behalf of a plurality of test devices, the process further includes acquiring session information from the test target device and transmitting the session information to another test device, and when the test device is not operating on behalf of the plurality of test devices, the process further includes receiving, by the test device, the session information from a representative test device of the plurality of test devices.

* * * * *